United States Patent [19]

Insley

[11] Patent Number: 5,733,629
[45] Date of Patent: Mar. 31, 1998

[54] WET SLIP RESISTANT SORBENT ARTICLE

[75] Inventor: Thomas I. Insley, Lake Elmo, Minn.

[73] Assignee: Minnesota Mining and Manufacturing Company, St. Paul, Minn.

[21] Appl. No.: 738,245

[22] Filed: Oct. 28, 1996

[51] Int. Cl.$^6$ ..................................................... B32B 27/14
[52] U.S. Cl. .................... 428/141; 428/198; 442/60; 442/101; 442/164; 442/170; 442/171; 442/351; 442/394; 442/396; 442/398; 442/400; 442/414
[58] Field of Search ................................. 428/141, 198; 442/60, 101, 164, 170, 171, 351, 394, 396, 398, 400, 414

[56] References Cited

U.S. PATENT DOCUMENTS

| | | |
|---|---|---|
| 3,668,050 | 6/1972 | Donnelly . |
| 4,118,531 | 10/1978 | Hauser . |
| 4,536,433 | 8/1985 | Sagi et al. .................. 428/195 |
| 4,609,580 | 9/1986 | Rockett et al. .................. 428/198 |
| 4,614,679 | 9/1986 | Farrington, Jr. et al. . |
| 4,644,592 | 2/1987 | Small .................. 4/583 |
| 4,781,962 | 11/1988 | Zamarripa et al. . |
| 4,813,948 | 3/1989 | Insley . |
| 4,822,669 | 4/1989 | Roga .................. 428/287 |
| 4,834,739 | 5/1989 | Linker, III et al. . |
| 4,850,991 | 7/1989 | Nakanishi et al. . |
| 4,895,753 | 1/1990 | Etter .................. 428/286 |
| 4,908,026 | 3/1990 | Sukiennik et al. . |
| 5,064,578 | 11/1991 | Insley et al. . |
| 5,122,407 | 6/1992 | Yeo et al. . |
| 5,173,346 | 12/1992 | Middleton .................. 428/53 |
| 5,451,437 | 9/1995 | Insley et al. . |
| 5,454,844 | 10/1995 | Hibbard et al. . |
| 5,468,536 | 11/1995 | Whitcomb et al. . |
| 5,500,267 | 3/1996 | Canning .................. 428/68 |

FOREIGN PATENT DOCUMENTS

| | | |
|---|---|---|
| 0 432 514 A2 | 12/1989 | European Pat. Off. ........ A47G 27/02 |
| 0 572 104 A1 | 12/1993 | European Pat. Off. ........ A47G 27/02 |
| 0 683 260 A2 | 11/1995 | European Pat. Off. . . |
| 0 691 203 A1 | 1/1996 | European Pat. Off. . . |
| 2 214 085 | 8/1989 | United Kingdom . |
| 2 214 085 B | 8/1989 | United Kingdom . |
| 2 268 399 | 1/1994 | United Kingdom ........... A47G 27/02 |
| WO 95/00097 | 1/1995 | WIPO . |

OTHER PUBLICATIONS

Instrument Makar, Inc. product literature, Nov. 4, 1996.
Medical/Surgical Catalog, Baxter Healthcare Corporation, 1993, pp. 392 and 225.
Superfine Thermoplastic Fibers, Van A. Wente, vol. 48, No. 8, Aug. 1956, pp. 1342–1346.

*Primary Examiner*—Christopher Raimund
*Attorney, Agent, or Firm*—Karl G. Hanson; MarySusan Howard

[57] ABSTRACT

A sorbent article comprises a sorbent layer having first and second major surfaces and a texturized polymeric skin layer secured to the first major surface of the sorbent layer. The article has a stiffness of about 200 N/g.cm$^{-2}$ or less. An article of this construction has excellent sorptive and non-slip properties, making it well suited for use on floors and other work surfaces. Wet kinetic coefficients of friction of 0.4 and greater can be demonstrated by the inventive articles. The article improves the safety of persons who need to stand, walk, or otherwise safely function on floors or other surfaces that are susceptible to wet conditions.

20 Claims, 1 Drawing Sheet

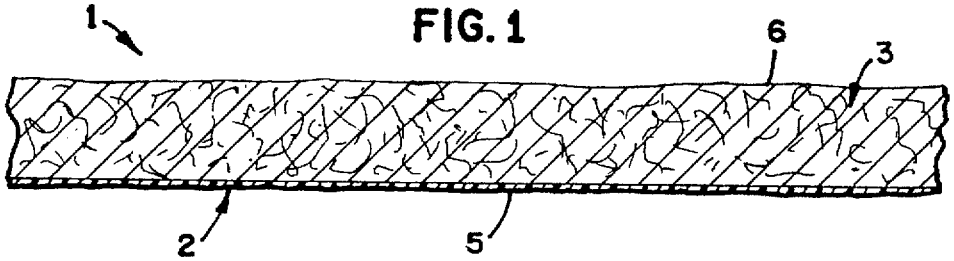
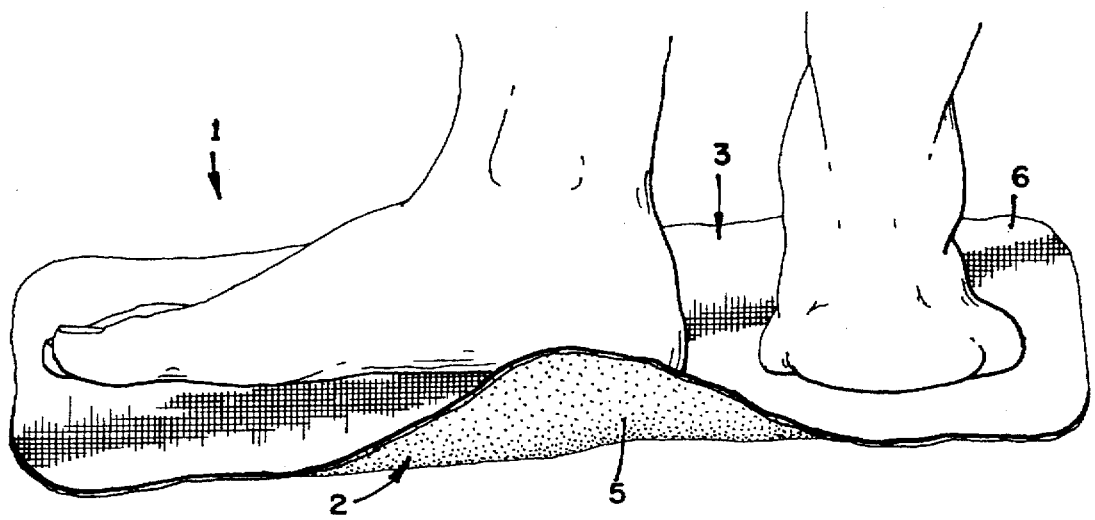

WET SLIP RESISTANT SORBENT ARTICLE

TECHNICAL FIELD

The invention provides a sorbent article that is useful in controlling fluids that have been spilled or discharged onto a floor or work surface. The article is sorbent and compliant, with a high wet kinetic coefficient of friction.

BACKGROUND

Many sorbent materials, such as towels, blankets, and the like, are used to control fluids that have been discharged to work surfaces. Fluid control is of concern in many environments, including industrial and technical facilities and food preparation areas. One particular example of an area where fluid control is of concern is in operating and medical procedure rooms. Fluids are used in and produced by many surgical procedures, and these fluids often spill or flow onto working surfaces and the floor. Although attempts have been made to contain the fluids before they reach work or traffic surfaces, this can not always be done in an efficient manner.

The fluids of concern in the medical field are generally physiological liquids such as blood and urine that may be combined with saline irrigation solutions. Liquids used in surgical preparation can also contaminate floors and work surfaces. Sometimes, for example in emergency rooms or trauma centers, whole blood is discharged into the work area. These fluids not only present a risk of exposure to infectious agents but create a serious potential for slips and injury. In other use areas the fluids may be aqueous or oil based, or may be water and oil emulsions.

Attempts have been made to control fluids that are discharged to floors or work surfaces. Donnelly, U.S. Pat. No. 3,668,050 discloses a disposable surgical drape comprising a fibrous base sheet having a primary operative area, a sheet of fluid impervious plastic film laminated to the base sheet, and a sheet of fluid sorbent plastic foam material laminated to the outer surface of the film. The patent discloses that the foam provides a surface that has a high coefficient of friction to provide anti-slip properties that prevent the accidental dislodgment of articles such as surgical instruments.

Nakanishi et al., U.S. Pat. No. 4,850,991 describes a sorbent article comprising a liquid permeable surface sheet, a liquid impermeable sheet and a sorbent layer between the two sheets. The leak proof sheet has a composite on its outside surface comprising a hydrophobic polymer and foamed polymer beads. The beads are said to improve the anti-slip properties of the article.

In U.S. Pat. No. 4,834,739 Linker III et al. describe a sorbent article that contains a sorbent, a bodyside layer, a backing layer, and a skid resistant coating that is applied to at least one of the layers. The coating has a coefficient of friction greater than 1 and a Sheffield smoothness rating of greater than about 200.

Although the prior art describes articles that have dry anti-skid features, a sorbent material that resists slipping when wet would greatly improve the safety of work areas where fluid control is of concern.

SUMMARY OF THE INVENTION

Accordingly, the invention provides a sorbent article that contains a sorbent layer having first and second major surfaces and a texturized polymeric skin layer secured to the first major surface of the sorbent layer. The sorbent article has a stiffness of about 200N/g.cm$^{-2}$ or less. This article is also slip resistant when wet, and has a wet kinetic coefficient of friction of at least about 0.4. The sorbent material may be used to control and sorb aqueous or oil-containing fluids.

The invention also provides a method of controlling fluids on a floor or other work surface by applying the sorbent material of the invention to the floor or other work surface such that the skin layer of the sorbent material contacts the floor surface. The wet kinetic coefficient of friction allows for good traction and slip prevention in combination without compromising sorbent properties. Thus, the invention is capable of preventing slips caused by wet floors or other work surfaces by applying the sorbent material of the invention to a floor or other work surface such that the skin layer is in contact with the floor or other work surface.

The article surprisingly combines the properties of good sorbency and slip resistance even when wet. The sorbent provides the ability to control a variety of fluids, including those that are aqueous as well as those that are partially or completely made up of oily liquids. The texturized polymeric skin adds strength to the article and the texture, in an article that has the necessary degree of conformability, helps provide the exceptional wet anti-slip properties of the article. Such wet anti-slip properties, as reflected in the wet kinetic coefficient of friction (WKCOF) increases the safety of areas where spilling or overflow of fluids occurs by providing stable footing for persons in the area even after the fluid has spilled onto the floor or work surface and been sorbed by the article.

As used herein, "stiffness" refers to the stiffness of fabric as measured by ASTM D 4032-82, "Stiffness of Fabric by the Circular Bend Procedure", reported as the deflection force in Newtons (N) divided by the weight of the article in g/cm$^2$. All stiffness is described as N/g.cm$^{-2}$ unless otherwise specified.

The wet and dry kinetic coefficients of friction of the articles described herein are unitless parameters measured by ASTM D 1894-93, "Static and Kinetic Coefficients of Friction of Plastic Film and Sheeting". A polished stainless steel plane was used as the test surface.

All percentages are weight percentages unless otherwise specified.

BRIEF DESCRIPTION OF DRAWINGS

FIG. 1 is a cross-sectional representation of a sorbent article where the sorbent is made from non-woven fibers.

FIG. 2 depicts the sorbent article in use.

DETAILED DESCRIPTION OF PREFERRED EMBODIMENTS

In general the sorbent articles of the invention have a texturized, lightweight polymeric skin on one face of a sorbent web. Sorbent webs, which provide the sorbent layer of the articles of the invention, are generally characterized by their solidity and composition, where solidity is defined by the formula:

$$\% \text{ solidity} = \left[ \frac{\text{web bulk density}}{\frac{\Sigma(\text{component density})}{(\text{component weight fraction})}} \right] \times 100\%$$

The sorbent layer of the article of the invention will typically have about 2 to 12% solidity, preferably about 4 to 8% solidity as calculated by the above formula. The sorbent has excellent sorbency with respect to many types of fluids, including physiological fluids such as blood, urine, mixtures of the same with water or saline, and so on. The sorbent also has good sorbent properties with other aqueous fluids as well as oil based fluids or fluids that have both aqueous and oily components. The bulk sorbency of the sorbent layer with a 0.9 wt-% NaCl solution is about 500 cm$^3$/m$^2$ to about 8,000 cm$^3$/m$^2$, preferably about 800 to 2,500 cm$^3$/m$^2$.

Essentially any sorbent material that has the above characteristics can be used in the sorbent article of the invention. Examples of useful sorbent materials include flexible sorbent foams such as the open-cell foams made from polyurethane and polyvinyl alcohols; woven fiber sheets from materials such as cotton, wool, rayon, polyester, or other natural or synthetic fibers, or combinations of natural and synthetic fibers; and non-woven fiber sheets.

Sorbent materials made from non-woven fibers are generally preferred as the sorbent layer of the article of the invention. Suitable non-woven sorbent materials typically include natural fibers such as cotton, wool, and rayon, as well as synthetic fibers that are bonded together by thermal, chemical, or mechanical means. Such synthetic fibers include, for example, polyolefins such as polyethylene, polypropylene, polybutylene, poly(4-methyl-1-pentene), and polyolefin copolymers; polyesters such as polyethylene terephthalate (PET), polybutylene terephthalate, and polyester ester copolymers such as HYTREL available from DuPont Co., Elastomers Division, Wilmington, Del.; polycarbonates; polyurethanes; polystyrene; polyamides such as nylon 6 and nylon 66; and thermoplastic elastomer block copolymers such as styrene-butadiene-styrene, styrene-isoprene-styrene, styrene-ethylene/butylene-styrene, available from Shell Oil Company, Houston, Tex., under the trademark KRATON. Combinations of the above polymeric microfibers, or blends of the polymeric components, may also be employed. For example, a blend of polypropylene and poly(4-methyl-1-pentene) can be used to make a nonwoven web that contains microfiber (see U.S. Pat. No. 4,874,399 to Reed et al.), or the web may contain bicomponent microfiber such as the polypropylene/polyester fibers (see U.S. Pat. No. 5,547,420 to Krueger et al.). Polymers useful for forming microfibers from solution include polyvinyl chloride, acrylics and acrylic copolymers, polystyrene, and polysulfone. For example, a thermally bonded web could utilize the thermal bonding properties of the fibers themselves for binding or the web could utilize thermal bonding fibers or particles in addition to the sorbent fibers. Examples of chemical bonding systems include latex resin bonding and the like. The web could also be bonded by needle tacking, stitch or entanglement bonding. In general, entanglement bonding is preferred because it allows for good conformance and flexibility.

A preferred non-woven material is prepared from a meltblown microfiber such as polypropylene that is entanglement bonded. The microfibers generally have a diameter of about 10 μm or less. The nonwoven microfiber webs may also include microfiber microwebs such as disclosed in U.S. Pat. No. 5,451,437 to Insley. Detailed information on how to prepare these webs can be found, for example, in this patent and in Insley, U.S. Pat. No. 4,813,948.

The sorbent layer may also incorporate other particulate or fibrous ingredients as desired to impart specific additional properties. Such ingredients can include supersorbents, dyes, pigments, fillers, light stabilizers, fire retardants, biocides, sanitizers, fragrances, and so on. The fibers of the sorbent may also be treated to increase their wettability, for example with a surfactant as described in Insley, U.S. Pat. No. 5,064,578.

A wet slip resistant thermoplastic skin layer is attached to the sorbent layer. This layer preferably makes up no more than about 15 wt-% of the total weight of the sorbent article, more preferably less than 10 wt-%, although the layer may be slightly heavier if necessary for particular applications. This skin layer is also sufficiently thin and/or compliant so that the compliancy of the sorbent layer is not affected and the overall stiffness of the sorbent article (i.e., the sorbent layer together with the skin layer) is no more than about 200N/g.cm$^{-2}$, preferably no more than about 100N/g.cm$^{-2}$. Typically, the skin layer is less than 35 micrometers in thickness, more typically less than 25 micrometers thick. A thickness of about 20 micrometers is preferred; skin layers having a thickness of less than about 10 micrometers are generally not desirable.

The skin layer may be attached to the sorbent layer by essentially any means known in the art, such as adhesive, heat lamination, melt coating, solvent coating, spot welding or other suitable means that provides a secure bond without significantly adversely affecting the sorbency or compliancy of the article. One preferred method of attachment is by use of a hot melt adhesive.

The skin layer is texturized to obtain the desired wet anti-slip properties. As used herein a "textured" or "texturized" surface is a surface that has a dimensional quality as opposed to a smooth, flat aspect. The entire layer or selected portions of the skin layer may be texturized. If desired, the surface topography of the texturized skin layer may be measured using a surface profilometer, which measures the height of the various peaks on the texturized surface. The roughness average ($R_a$), the mean height of the peaks over the entire measured area, and the root mean square roughness ($R_q$), the root mean square of the peaks over the measured area, as measured from the mean linear surface can then be determined for the area. Procedures for determining Ra and Rq are described in Deutsches Institut Fur Normung (DIN) Standard Nos. DIN 4768 (PT1) and DIN 4762 (PT2), respectively.

The texture can be obtained using many known methods. For example, the texture of the sorbent layer can be translated or transmitted through the skin layer if the skin layer is applied using an appropriate coating or adhesive process, or the skin layer can be texturized before being applied to the sorbent layer, for example by hot pressing, embossing or casting the skin layer onto a textured surface.

In addition to or in combination with the above methods, the skin layer can be applied in a manner that allows the texture of the sorbent to be transmitted or translated to the skin layer when pressure is applied to the article, for example by foot pressure.

One preferred method of obtaining a textured surface on the skin layer is through use of microreplication technology. This can impart a rough but controlled geometric topography to the skin layer's surface. The topography can take on various geometric configurations, including conical, pyramidal, cylindrical, cubic, string-like, and so on. Topographical structures can be arranged in ordered patterns or can incorporate randomly distributed elements. Patterns can further be formed of discrete geometric configurations or can be composed of interconnecting geometric elements. The selected film can be hot pressed onto a microreplication tool or cast onto the microreplication tool and then allowed to cure. Representative microreplicated surfaces are described in Hibbard et al., U.S. Pat. No. 5,454,844.

The skin layer can be made of a flexible elastomeric material that provides the desired conformance and anti-skid properties to the sorbent article. The term "elastomer" is generally understood to be a material that at room temperature can be repeatedly stretched to at least twice its original length and which upon release of the stress will return with force to approximately its original length. Elastomers useful as the skin layer can be homopolymers, copolymers or polymer blends or alloys. Examples of homopolymeric elastomers that are useful as the skin layer include flexible thermoplastic resins such as synthetic and natural rubbers, linear low density polyethylene (LLDPE), ethylene-vinyl acetate copolymers (EVA), plasticized polyvinyl chloride (PVC), and the like. Of these, EVA is a preferred thermoplastic elastomer, for example ELVAX 3174 available from DuPont Polymers of Wilmington, Del.

The combined properties of rigid polymers and rubbery or flexible polymers can also be balanced as desired to prepare the skin layer. For example, one or more rigid thermoplastic resins such as polypropylene, polystyrene, high density polyethylene (HDPE) and the like can be combined with one or more flexible thermoplastic or rubbery elastomers as an alloy or blend. The combination of polypropylene and ethylene-vinyl acetate represents a preferred polymer blend. Alternatively, block copolymers such as those of the -A-B-A- type can be utilized wherein the A block is a monomeric unit of a hard or rigid polymer and B is a monomeric unit of an elastomeric polymer. The proportions of rigid and elastomeric polymers (or monomeric units, for copolymers) are balanced to provide the desired properties. In general, a blend of about 75 to 85% of the rigid polymer and about 25 to 15% of the flexible or elastomeric polymer can be used, preferably about 75% and 25%, respectively.

The inventive sorbent articles have a stiffness of 200 N/g.cm$^{-2}$ or less, preferably 150 to 500 N/g.cm$^{-2}$. At the lower end, the articles typically have a stiffness greater than 25 N/g.cm$^{-2}$. It has been discovered that articles that have a stiffness less than 200 N/g.cm$^{-2}$ allow the articles to resist movement when exposed to a force under wet conditions. Articles that have a stiffness less than 10 N/g.cm$^{-2}$ in general may be somewhat flimsy and lacking in durability, although they may demonstrate acceptable coefficients of friction.

The kinetic coefficient of friction (KCOF) of an article is a measure of its anti-slip nature, and therefore is a useful way to determine the tendency of an article to stay in place even with foot or equipment traffic.

An article that has a kinetic coefficient friction of 0.1 to 0.2 can easily be moved over a surface with applied foot pressure, while a material with a kinetic coefficient of friction of about 0.4 provides good slip resistance and a surface having a kinetic coefficient of friction of about 0.7 is difficult to move with foot pressure.

A cross-section of the article of the invention is found at FIG. 1, showing the sorbent article of the invention 1 with a lightweight polymeric skin 2 having a textured surface 5 on one surface of a sorbent web 3, which may be made of non-woven fibers. The fluid is sorbed by the top surface 6 of the sorbent layer of the article.

The sorbent article of the invention can be used in a variety of situations where control of fluids is of concern. Medical areas such as operating and emergency rooms are one example of a use environment for the sorbent article. Other environments include the food service industry, where the article may be used to sorb aqueous or oily fluids from cooking operations, dishwashing, and so on. Janitorial and other cleaning operations, as well as areas in or around pools, showers, and the like are further examples of environments where it is desirable or necessary to control aqueous or oily fluids.

FIG. 2 shows an example of the sorbent article in use. The article 1 is placed on the floor or other surface with the texturized surface 5 of the skin layer 2 facing down so that it contacts the surface. A person can then stand or walk on the surface 6 of the sorbent layer 3 without fear of slipping. The article may be placed on the surface either before or after fluids have been spilled or discharged onto the surface, but is preferably before such discharge occurs.

The invention is further described by the following examples, which are understood to be illustrative and not limiting of the invention.

EXAMPLES

The following test methods were used to characterize the articles of the invention:

Coefficient of Friction

Slip evaluations were conducted using an Instron Tensile test unit with an crosshead speed of 150 millimeters per minute (mm/min) in accordance with ASTM D1894-93. All tests were conducted against a polished stainless steel plane with no foam applied to the sled. To determine wet kinetic coefficient of friction (WKCOF), a uniform spray of PhysioSol® irrigation solution, available from Abbott Laboratories, Chicago, Ill., was applied to the surface before each pull.

Fabric Stiffness

Stiffness evaluations were conducted in accordance with ASTM D 4032. Tests were conducted on a single thickness of material using an Instron Tensile test unit driven at a compressive crosshead speed of 150 mm/min, with the face of the plunger traveling only to the bottom of the platform orifice. The samples were tested with their coated side facing up. Stiffness was reported as the deflection force in N divided by the weight of the article in g/cm$^2$.

Bulk Sorbency

A sorbent material sample was saturated in a bath of 0.9 wt-% saline solution for 2 minutes. The sample was then removed from the bath and placed on an open mesh screen for 2 minutes to drain excess liquid. The amount of liquid sorbed by a unit weight of material was determined, and the bulk sorption was reported in cubic centimeters per square meter (cm$^3$/m$^2$).

Example 1

The article was produced by coating a thin polymeric skin onto a hydrophilic meltblown sorbent. The texture of the meltblown sorbent was translated through the polymeric skin. The meltblown sorbent was prepared as described in Insley, U.S. Pat. No. 4,813,948 and was comprised of a source web of 60 wt-% polypropylene microfibers (Fina 100 MFI, available from Fina Oil and Chemical Co., Dallas, Tex.) having fibers in the 5 to 10 micrometer (µm) diameter size combined with 20 wt-% 15 denier PET staple fibers (Type 295 available from Hoechst Celanese, Charlotte, N.C.), and 20 wt-% microfiber microwebs. Ten wt-% of an ethoxylated octylphenol nonionic surfactant, available as HYONIC OP9 from Henkel Corp., Ambler, Pa., was melt blended with the resin used in the microfiber elements as described in Insley et al., U.S. Pat. No. 5,064,578. This was done during extrusion and rendered the fibers instantaneously wettable with 0.9% saline solution. The weight and solidity of the resulting web was 180 g/m$^2$ and 6% respectively. The bulk absorbency of the web was 2,000 cm$^3$/m$^2$.

The barrier/slip resistance film of 75 wt % polypropylene (Himont KS-084P, available from Himont USA Inc., Wilmington, Del.) blended with 25 wt % ethylenevinyl acetate (ELVAX 3174, available from DuPont Polymers, Wilmington, Del.) was coated from the melt onto the sorbent resulting in a coating weight of 14 g/m², or 7 wt-%.

The article's stiffness was 60 N/g.cm$^{-2}$ dry KCOF of the article was 0.9 and the WKCOF was 0.7. Surface roughness was measured over a 1.9 mm by 2.5 mm sample, using a laser profilometer and the methods described in DIN 4768 (PT1) and 4762 (PT2). The surface of the skin layer had an $R_q$ of 19.24 µm and an $R_a$ of 17.16 µm.

Example 2

This Example was prepared using the sorbent and skin of Example 1 with the exception that the skin was attached to the sorbent using a hot melt spray adhesive. The adhesive (HL-1358-X thermoplastic block copolymer type available from H.B. Fuller Co., St. Paul, Minn.) was applied to the sorbent at a rate of 10 g/m². Immediately after applying the adhesive, the skin was brought into contact with and pressed onto the sorbent. The sorbent layer's texture was transmitted through the skin layer.

The article's dry KCOF was 1.0, and its WKCOF was 0.8. The stiffness was 60 N/g.cm$^{-2}$.

Example 3

This example demonstrates the use of microstructure surfacing to impart a rough but controlled geometric topography to the outwardly facing surface of the polymeric skin to impart improved WKCOF.

A microreplicated surface was produced on one surface of a 38 Tm film of 75 wt-% polypropylene (Himont KS-084P, available from Himont USA Inc., Wilmington, Del.) blended with 25 wt-% ethylene-vinyl acetate (ELVAX 3174, available from DuPont Polymers, Wilmington, Del.). The microreplicated surface was formed by placing the film onto a microreplicated production tool of the type described in Hibbard et al., U.S. Pat. No. 5,454,844. The skin was embossed using a nickel plated production tool having a pyramidal type pattern such that the pyramid bases were butted against one another. The height of the pyramids was about 355 µm with external dihedral angles between the pyramids varying randomly in a range of about 15° to 45°. The embossed film received the base and limited depth imprint of the pyramids. The embossed area of the film was approximately 735 cm² and clamped with a force of 34 kiloNewtons (kN) in a hot press at a temperature of 40° C. While clamped the temperature was increased to 95° C. and then cooled to 40° C. The film was then removed from the press and plate and was then adhesively attached to a sorbent web like that of Example 1 using the attachment method described in Example 2. The resulting article had a wet KCOF of 1.1 and a dry KCOF of 1.2; and a stiffness of 60 N/g.cm$^{-2}$.

Example 4

This Example demonstrates the performance of the invention in environments that would encounter oily liquids such as in food preparation. Example 4 was prepared in a manner like that of Example 3 except that a 30.5 Tm film of Engage type EG 8100 ethylene/1-octene copolymer (available from DuPont Dow elastomers, Wilmington, Del.) was used. A wet slip resistance test was conducted in accordance with the coefficient of friction test method described above except that white mineral oil type Klearol (available from Witco Corporation, Petrolia, Pa.) was used as the test liquid. The WKCOF of the article was 0.4. The article's stiffness was 50 N/g.cm$^{-2}$.

All mentioned patents and patent applications are incorporated in total into this specification.

Since many embodiments of the invention can be made without departing from its spirit and scope, the invention's scope is defined by the following claims.

I claim:

1. A sorbent article comprising:
   (a) a sorbent layer having first and second major surfaces and
   (b) a texturized polymeric skin layer secured to the first major surface of the sorbent layer, wherein the article has a stiffness of about 200 N/g.cm$^{-2}$ or less and a wet kinetic coefficient of fiction of 0.4 or more.

2. The article of claim 1 wherein the sorbent layer comprises a non-woven fibrous material.

3. The article of claim 1 wherein the sorbent layer comprises a non-woven web comprising melt-blown microfiber.

4. The article of claim 1 wherein the sorbent layer comprises a melt-blown polypropylene microfiber wherein the fibers are entanglement bonded.

5. The article of claim 1 wherein the polymeric skin layer has a thickness of about 10 to 35 micrometers.

6. The article of claim 1 wherein the polymeric skin layer comprises a blend of polypropylene and ethylene-vinyl acetate.

7. The article of claim 1 wherein the polymeric skin layer comprises a blend of 75 wt-% polypropylene and 25 wt-% ethylene-vinyl acetate.

8. The article of claim 1 wherein the stiffness is about 150 to 50 N/g.cm$^{-2}$.

9. The article of claim 1 wherein the wet kinetic coefficient of friction is at least 0.7.

10. The article of claim 1 wherein the wet kinetic coefficient of friction is at least 1.

11. The article of claim 1 wherein the polymeric skin layer is cast onto the sorbent layer.

12. The article of claim 1 wherein the polymeric skin layer comprises 15 wt% or less of the article's total weight.

13. The article of claim 1 wherein the polymeric skin layer has a texture formed by embossing or casting the polymer onto a microreplication tool.

14. The article of claim 1 further comprising a layer of adhesive between the sorbent layer and the skin layer.

15. The article of claim 14 wherein the adhesive is a hot melt adhesive.

16. The article of claim 1 wherein the skin layer is spot welded to the sorbent layer.

17. A method of preventing slips caused by a wet floor or other work surface, the method comprising applying the sorbent article of claim 1 to the floor or other work surface such that the skin layer of the sorbent article contacts the floor or other work surface to allow the article to sorb fluid on the floor while at the same time resisting movement across the floor or other work surface.

18. A method of controlling fluids on a floor or other work surface, the method comprising applying the sorbent article of claim 1 to the floor or other work surface such that the skin layer of the sorbent material contacts the floor or other work surface.

19. The method of claim 18, wherein the sorbent layer of the sorbent article includes a non-woven web containing melt-blown microfiber.

20. A sorbent article comprising:
   (a) a sorbent layer having first and second major surfaces, said layer comprising a non-woven web of melt blown microfiber that is entanglement bonded;

(b) a layer of hot melt adhesive; and
(c) a texturized polymeric skin layer secured to the first major surface of the sorbent layer, said skin layer comprising a blend of 75 wt-% polypropylene and 2 wt-% ethylene vinyl acetate and having a thickness of about 0.6 to 0.75 mil, wherein the material has a stiffness of about 200 N/g.cm$^{-2}$ or less and a wet kinetic coefficient of friction of at least 0.4.

* * * * *

UNITED STATES PATENT AND TRADEMARK OFFICE
CERTIFICATE OF CORRECTION

PATENT NO. : 5,733,629
DATED : March 31, 1998
INVENTOR(S) : Thomas I. Insley

It is certified that error appears in the above-identified patent and that said Letters Patent is hereby corrected as shown below:

Column 9, line 4, "2" should read --25--.

Signed and Sealed this

Fifteenth Day of June, 1999

Attest:

Q. TODD DICKINSON

Attesting Officer    Acting Commissioner of Patents and Trademarks